United States Patent
Bernotavicius et al.

(10) Patent No.: US 10,162,980 B1
(45) Date of Patent: Dec. 25, 2018

(54) MERGED PERMISSION MODES

(71) Applicant: Qumulo, Inc., Seattle, WA (US)

(72) Inventors: Remi Bernotavicius, Seattle, WA (US); Jose Costa, Seattle, WA (US); Zacharie Lamont Kirsch, Seattle, WA (US); Jason Sturgeon, Seattle, WA (US); Philip Taron, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/004,208

(22) Filed: Jun. 8, 2018

(51) Int. Cl.
  *H04L 29/06* (2006.01)
  *G06F 21/62* (2013.01)
  *G06F 21/31* (2013.01)
(52) U.S. Cl.
  CPC ......... *G06F 21/6218* (2013.01); *G06F 21/31* (2013.01)
(58) Field of Classification Search
  CPC ............................ G06F 21/6218; G06F 21/31
  See application file for complete search history.

(56) References Cited

U.S. PATENT DOCUMENTS

| 2004/0255048 A1* | 12/2004 | Lev Ran | G06F 9/546 709/249 |
| 2010/0241668 A1* | 9/2010 | Susanto | G06F 21/305 707/784 |
| 2016/0359859 A1* | 12/2016 | Capone | H04L 63/101 |

\* cited by examiner

*Primary Examiner* — Shawnchoy Rahman
(74) *Attorney, Agent, or Firm* — John W. Branch; Lowe Graham Jones PLLC

(57) ABSTRACT

Embodiments are directed to managing data in a file system. A file system engine may provide a file system that includes file system objects accessible by two or more clients that use different native permission schemes. The file system engine may receive an access request from a client to access the file system objects that includes native permission values. A permissions engine provides platform permission values from a platform permission scheme associated with the file system objects. The permissions engine provides requested platform permission values based on the platform permission scheme and the native permission values included in the access request. The permissions engine compares the requested platform permission values to the platform permission values associated with the file system objects. The permissions engine provides access rights to the file system objects based on an affirmative result of the comparison.

28 Claims, 10 Drawing Sheets

MERGED PERMISSION MODES

TECHNICAL FIELD

The present invention relates generally to file systems, and more particularly, but not exclusively, to managing file permission and access control in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be accessed from client systems that may have different or mismatched permission or access control semantics. Reasonable users may expect file system object permissions or access control semantics that are (or appear to be) consistent with the permissions or access control semantics native to client system they are working with. In some cases, the mismatch of permission or access control semantics across client systems may cause undesirable results that confuse or frustrate users of distributed file system. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
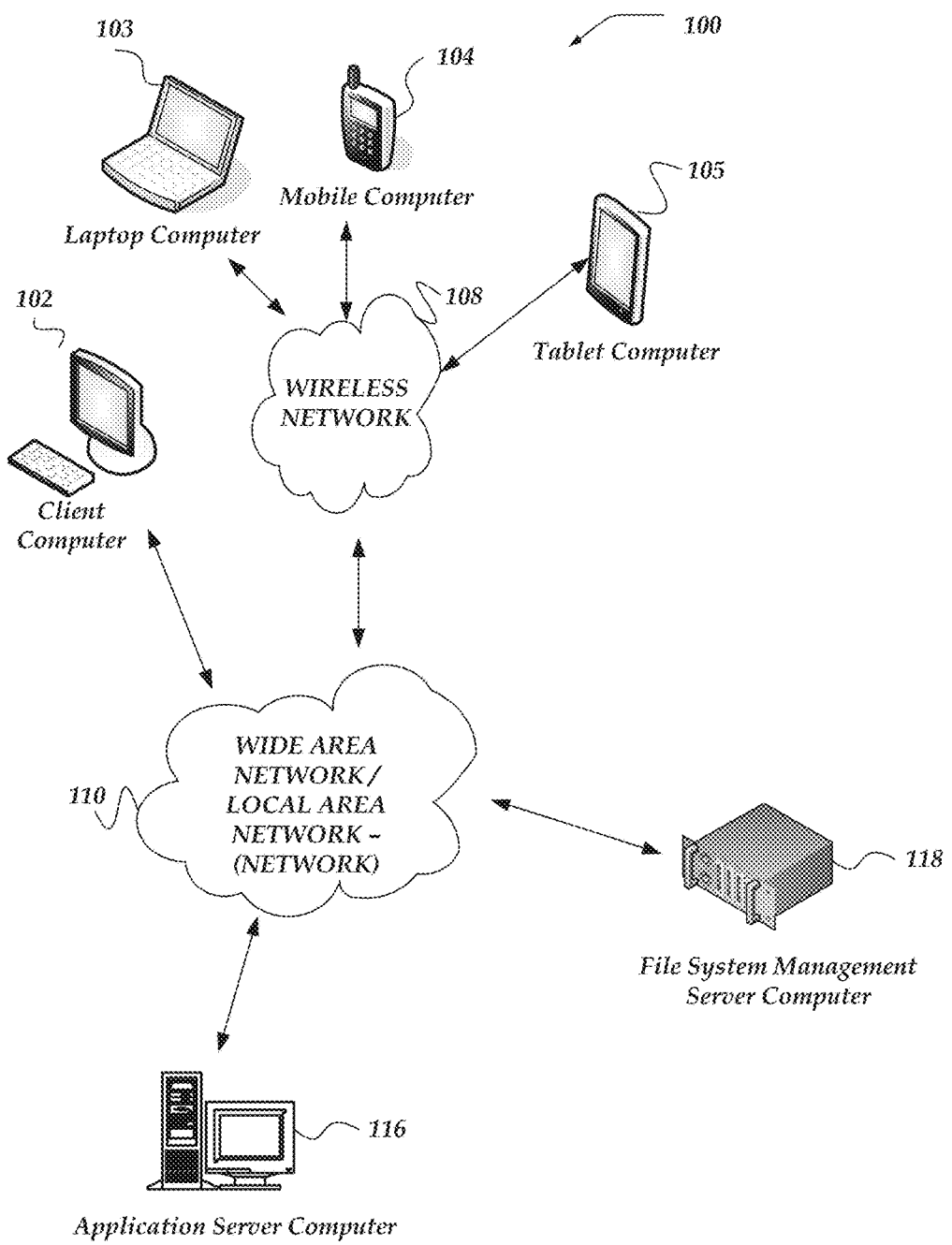
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the term "file system object permissions," or "permissions" refer to features of file systems related to managing or controlling the access rights for various file system objects in the file systems. Herein, the term permissions is assumed to encompass the different terms used by various file systems to refer to file system object permissions, such as, access control lists, permission values, or the like. In some cases, different computer operating systems or file systems may define or enforce differing permission semantics.

As used herein the term "native permissions," or "native permission scheme" refer to file system object permissions values, features or semantics that are native to a given operating system or file system. Note, in some cases, an operating system or file system may support more than one native permission scheme.

As used herein the term "client native permissions," or "client native permission scheme" refer to file system object permission schemes supported or used by clients of a file system. In some cases, the client native permission schemes may be different than the permissions used by other client systems or the distributed file system.

As used herein the term "platform permissions," or "platform permission scheme" refer to file system object permission values, features or semantics used by a file system. Note, in some cases, platform permissions may support permission values, features or semantics that may differ from one or more of the clients that store or access file system objects that are stored in a file system.

As used herein the term "permission value" refers to a value that represents an access right or privilege of with a permission scheme. These may include values that represent access rights or access privileges, such as, read, write, move, create, delete, copy, link, unlink, or the like, or combination thereof. File system objects may be associated with one or more permission values. Different permission schemes may support the different access rights or access privileges. Accordingly, different permission schemes may have different permission values.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system engine may be instantiated to perform actions for managing data in a file system, as described below.

In one or more of the various embodiments, the file system engine may provide a file system that includes one or more file system objects such that the one or more file system objects may be accessible by two or more clients that may use different native permission schemes.

In one or more of the various embodiments, the file system engine may receive from a client, an access request that may be associated with the one or more file system objects such that the access request includes one or more native permission values that may be supported by the client.

In one or more of the various embodiments, the file system engine performs further actions, including: receiving an access request from the client to store a file system object in the file system, such that the file system object may be associated with one or more native permission values; and employing the permissions engine to associate one or more inheritable platform permission values to the file system object based on the platform permission values that may be associated with a parent file system object or a container file system object associated with the file system object.

In one or more of the various embodiments, a permissions engine may be instantiated to perform actions as described below.

In one or more of the various embodiments, the permissions engine may provide one or more platform permission values from a platform permission scheme such that the one or more platform permission values may be associated with the one or more file system objects, and such that the platform permission scheme reduces computing resources employed to access the one or more file system objects by replacing use of the two or more different native permission schemes.

In one or more of the various embodiments, the permissions engine may provide one or more requested platform permission values based on the platform permission scheme and the native permission values included in the access request. In one or more of the various embodiments, providing the one or more platform permission values may include providing one or more joint platform permission values that are supported by each of the two or more clients; and providing one or more disjoint platform permission values that may be supported by less than all of the two or more clients.

In one or more of the various embodiments, the permissions engine may compare the one or more requested platform permission values to the platform permission values associated with the one or more file system objects. In one or more of the various embodiments, the comparison may include iterating though the one or more platform permission values; and determining the access rights to the one or more file system objects based on a first platform permission value that matches the access request. In one or more of the various embodiments, the comparison may include communicating with a separate service to confirm one or more characteristics of the client or the access request; and modifying the provided access rights based on a response to the communication.

In one or more of the various embodiments, the permissions engine may provide one or more other requested permission values included in another access request from another client such that the other access request may be associated the one or more file system objects, and such that the one or more other requested permission values may be unsupported by the native permission scheme used by the client; and associating both the one or more requested permission values and the one or more other permission values with the one or more file system objects.

In one or more of the various embodiments, the permissions engine may provide access rights to the one or more file system objects based on an affirmative result of the comparison.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another.

Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
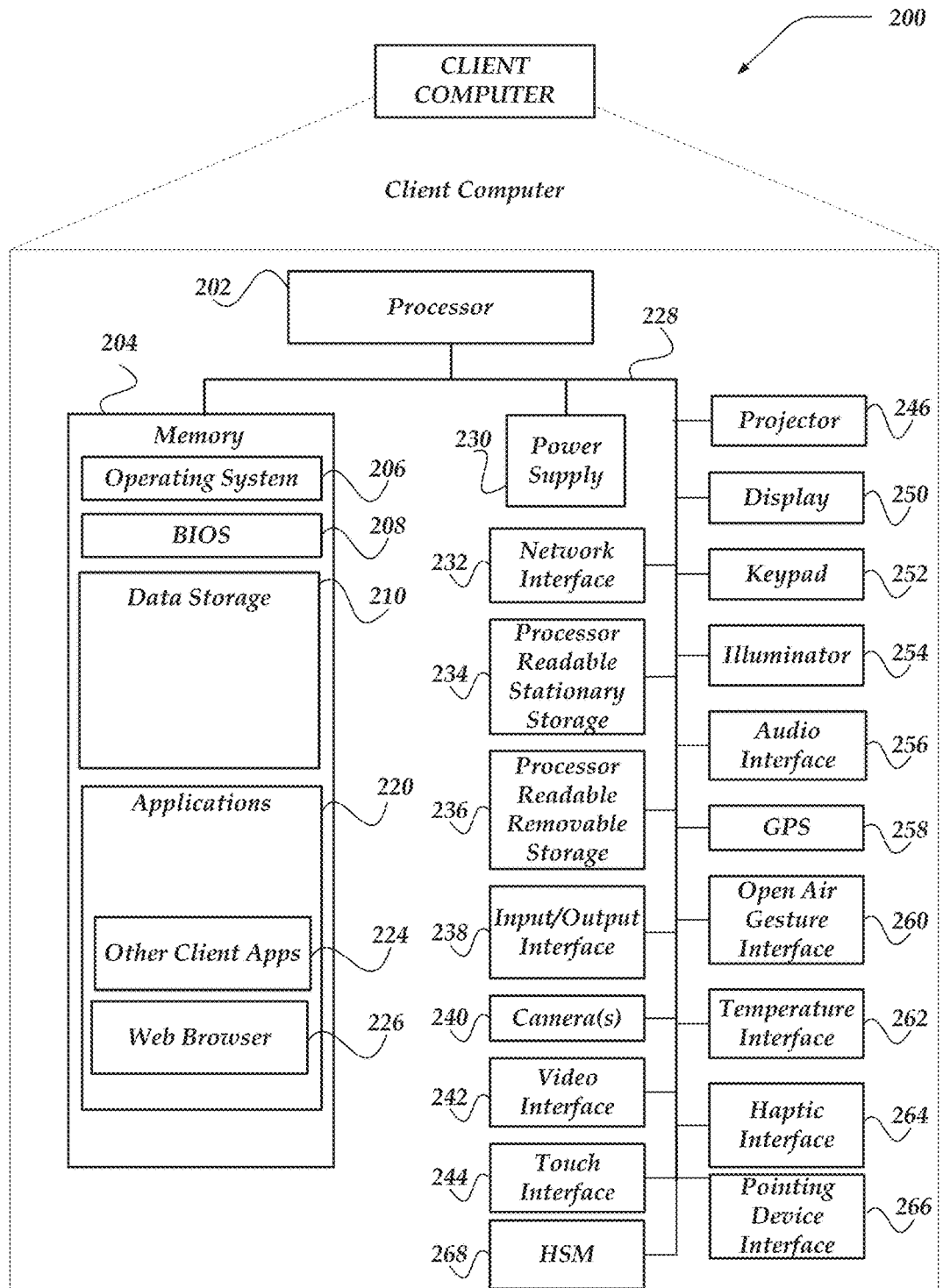
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
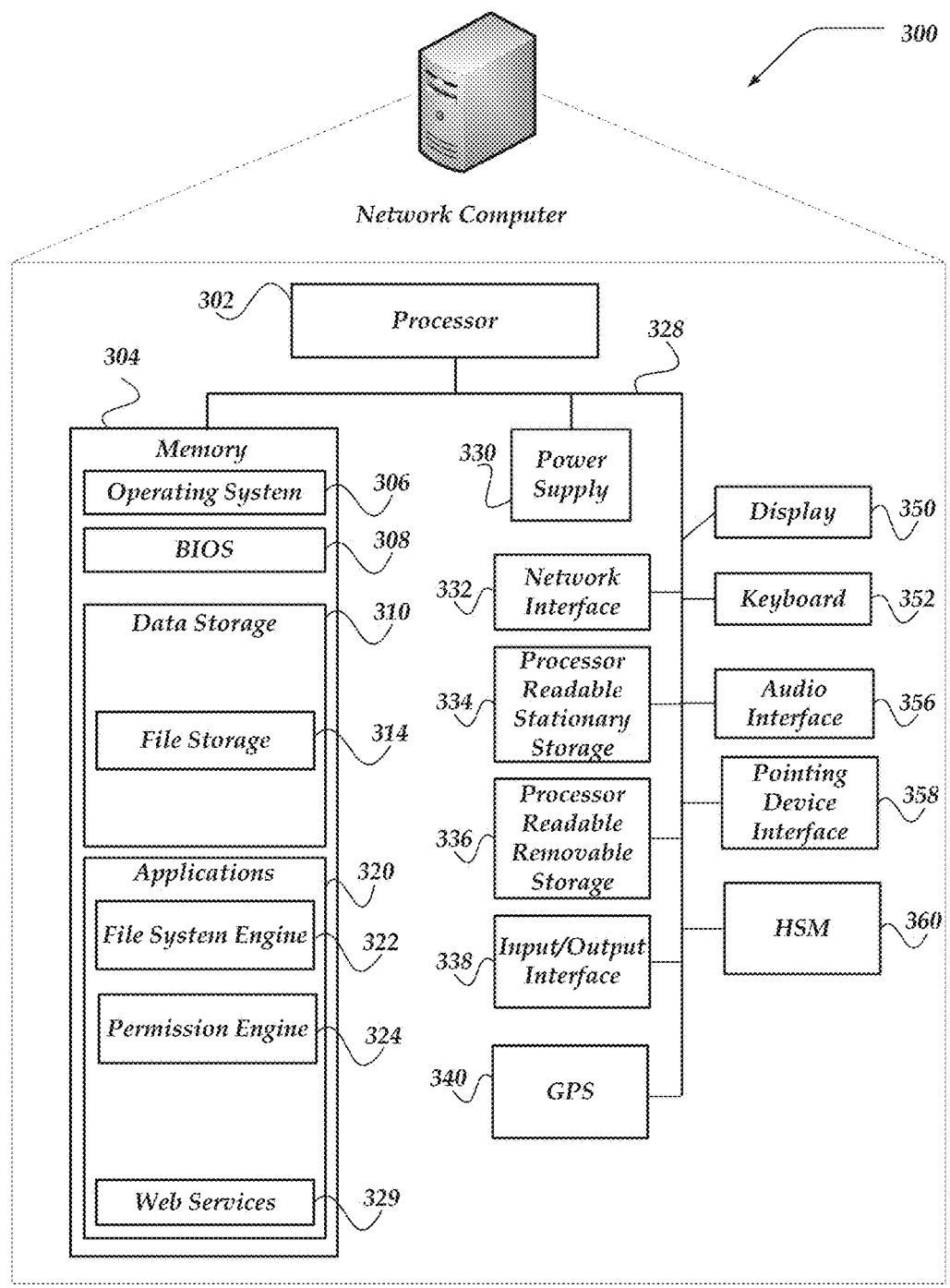
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, permissions engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, permissions information, file meta-data, data structures, or the like, that represent one or more portions of a distributed file system.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, permissions engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, permissions engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, permissions engine 324, web services 329, or the like, may be provisioned and de-commissioned automatically.

Also, in one or more of the various embodiments, file system engine 322, permissions engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
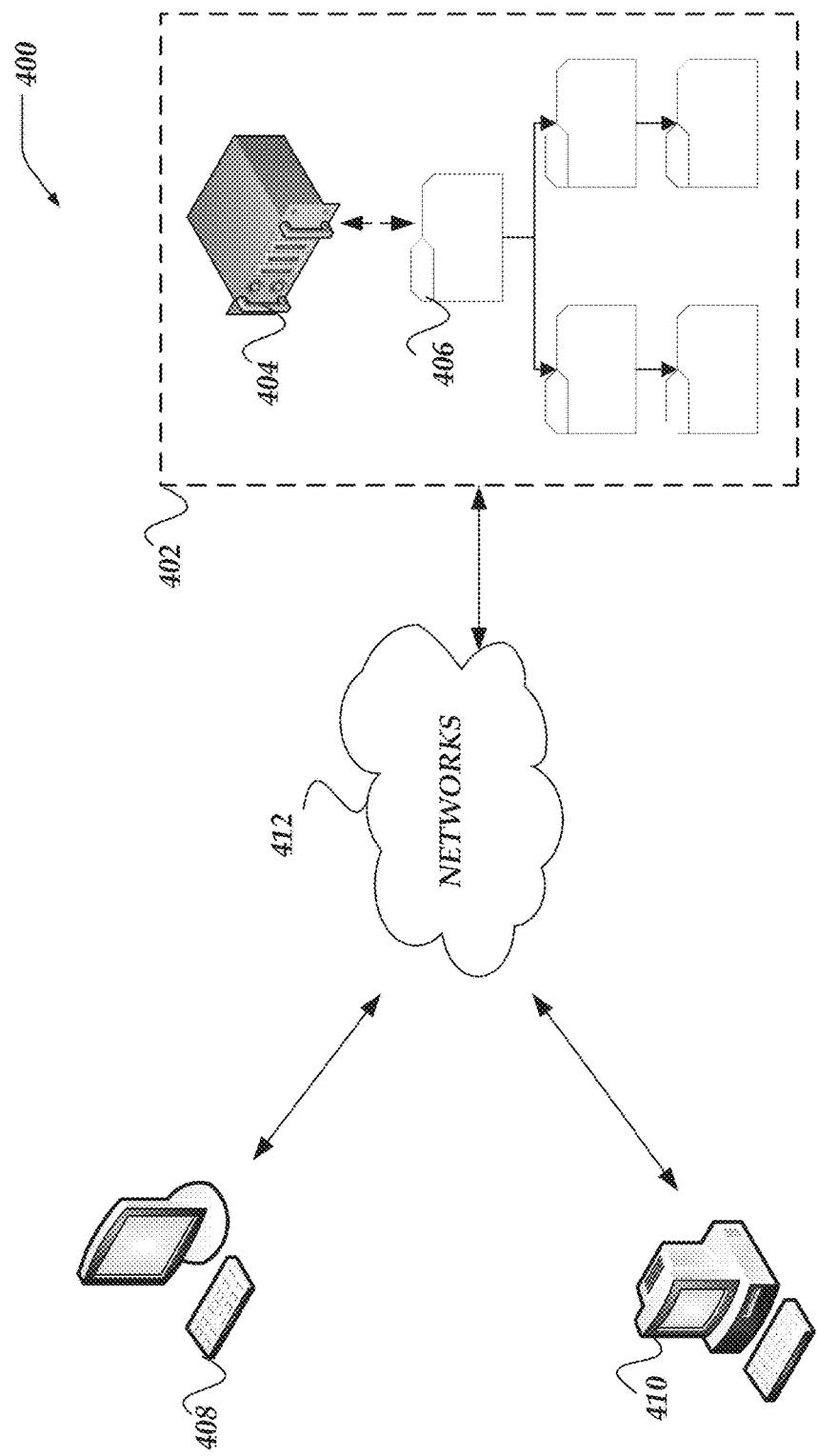
FIG. 4 illustrates a logical architecture of a system for merged permission modes for secure distributed file systems in accordance with one or more of the various embodiments.

FIG. 4 illustrates a logical architecture of system 400 for merged permission modes for secure distributed file systems in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, or the like.

In one or more of the various embodiments, the implementation details that enable file system 402 to operate may be hidden from clients, such that they may be arranged to use file system 402 the same way they use other file systems, including local file systems. Accordingly, in one or more of the various embodiments, clients may be unaware that they are using a file system that supports permission rules or permission semantics that differ from their native permissions because file system engines or permissions engines may be arranged to mimic the interface or behavior of native file systems used by the clients.

Also, while file system 402 is illustrated as using one file system management computer each with one set of file system objects, the innovations described herein are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, one or more on-premises servers, or the like, or combination thereof.

In one or more of the various embodiments, client computer 408 and client computer 410 may be considered to have native file systems or at least native permissions that may support permission semantics that may be different or inconsistent with each other. Accordingly, in one or more of the various embodiments, some permission semantics used or expected by client computer 408 may be different than permission semantics used or expected by client computer 410.

In one or more of the various embodiments, a user of client computer 410 may configure permissions for one or more file system objects stored in file system 402. Accordingly, those same file system objects may later be accessed via client computer 408 which may be assumed in this example to have native permissions that have different value, semantics, or features than the native permissions of client computer 408. For example, client computer 408 may rely on file permission values while client computer 410 may use access control lists. Thus, in one or more of the various embodiments, one or more clients may associate file system objects with permission values that may be incompatible or inconsistent with native permission schemes of one or more other clients. However, in one or more of the various embodiments, clients having a particular native permission scheme may be arranged to access file system objects stored in file system 402 that were assigned permission values from a different permission scheme.

Accordingly, in one or more of the various embodiments, a permissions engine running on a file system management computer, such as, file system management computer 404 may be arranged to manage the mismatches between native permission schemes. In one or more of the various embodiments, permissions engines may be arranged to reconcile differences between two or more of the various native permission schemes of the various clients that may be accessing a distributed file system.

In one or more of the various embodiments, permissions engines may be arranged to ensure that access rights established under one native permission scheme are honored by clients that use a different native permission scheme. Accordingly, in one or more of the various embodiments, permissions engines may be arranged provide a platform permission scheme that may be used internally by a distributed file system. In some embodiments, platform permission values that comprise a platform permission scheme may be a super-set of one or more native permission schemes recognized or supported by the file system.

In one or more of the various embodiments, a permissions engine may be arranged to ensure that native permission semantics associated with one type of client do not disrupt native permission semantics associated with other type of clients. In some embodiments, clients may be enabled to access file system objects created by different types of clients having different native permission semantics. In one or more of the various embodiments, a permissions engine may be arranged to transform or map platform permission values associated with a file system object to native permission values compatible with various types of clients.

Also, in one or more of the various embodiments, the permissions engine may be arranged to map platform permission values to client native permission values while preserving permission information that may be meaningful to some client types and not others. For example, a first client type may support richer or more detailed permission semantics that a second type of client. Accordingly, if a first client type assigns native permission values that are unknown or irrelevant to a second client type to a file system object, the permissions engine preserves the first native permission values in the platform permissions associated with the file system object. If a first type of client accesses the file system object, the permissions engine may be arranged to map one or more platform permission values to one or more first native permission values including permission values that are inconsistent with other native permission schemes used by different client types.

Likewise, in some embodiments, if a client attempts to access a file system object that is associated with one or more platform permission values that are not recognized or compatible with the client as well as other platform permission values that the client supports, the permissions engine may map the platform permission values associated with the file system object to the native permission values recognized by the client while preserving platform permission values that are not supported by that client.

Figure 5:
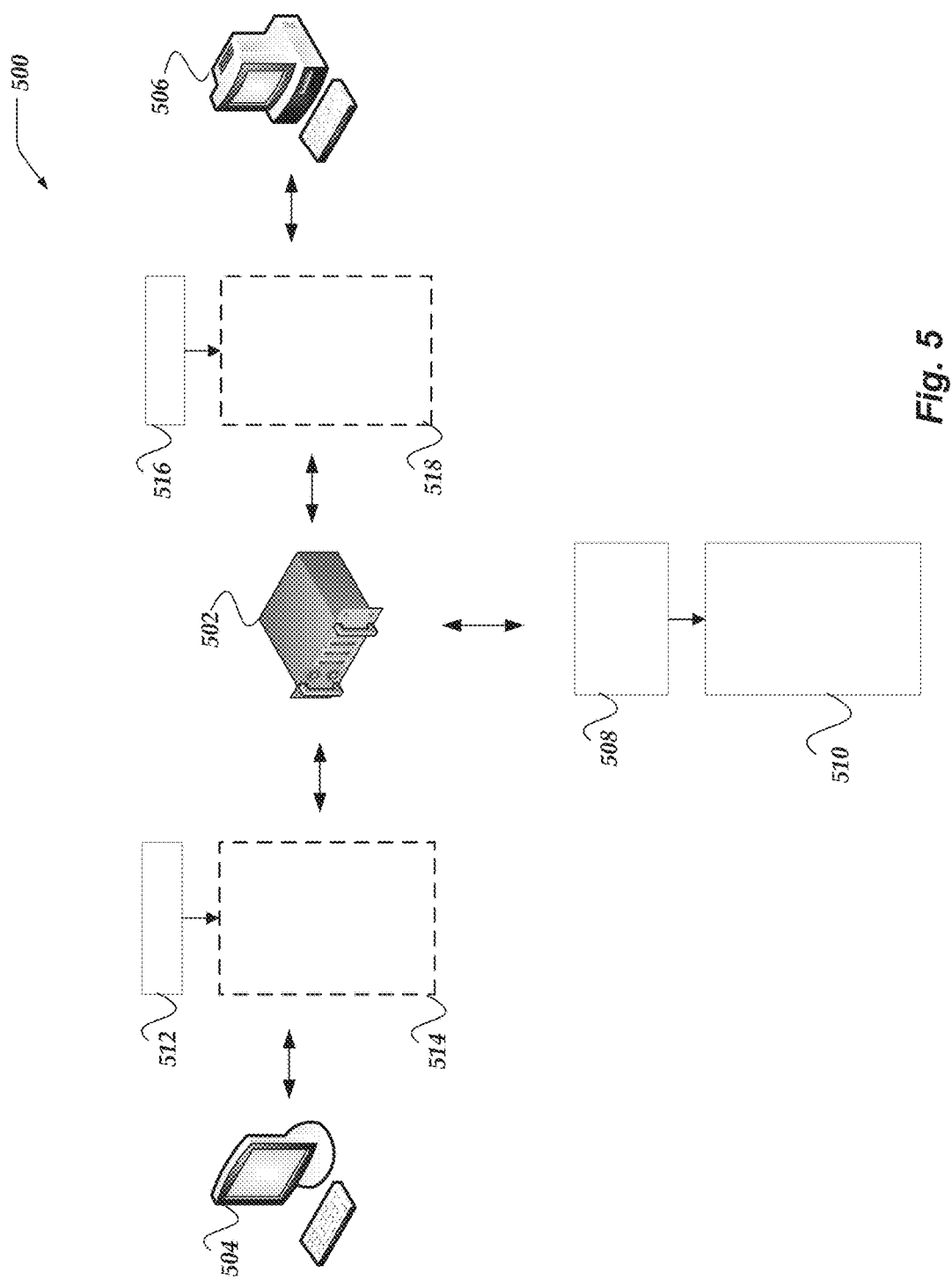
FIG. 5 illustrates a portion of a logical architecture of a file system for merging permissions modes in accordance with one or more of the various embodiments.

FIG. 5, illustrates a portion of a logical architecture of file system 500 for merging permissions modes in accordance with one or more of the various embodiments. In one or more of the various embodiments, file system 500 may include file system management computer 502, client 504, client 506, or the like. In this example, it may be assumed that client 504 and client 506 may support native permissions that have one or more different rules or semantics.

Also, in one or more of the various embodiments, file system object 510 may be a file system object stored in file system 500. Accordingly, in one or more of the various embodiments, file system objects, such as file system object 510 may be associated platform permissions 508. In one or more of the various embodiments, platform permissions 508 may represent the data structures used to store or represent the platform permission values associated with file system object 510.

In one or more of the various embodiments, file system object 514 may represent logical representation of file system object 510 as viewed by client 504. Accordingly, in some embodiments, native permissions 512 represents the data structures used to store or represent the native permission values for client 504 that may be associated with file system object 510.

Similarly, in one or more of the various embodiments, file system object 518 may represent logical representation of file system object 510 as viewed by client 506. Accordingly, in some embodiments, native permissions 516 represents the data structures used to store or represent the native permission values for client 506 that may be associated with file system object 510.

In one or more of the various embodiments, file system object 514 and file system object 518 represent the same data or contents as file system object 510. However, in one or more of the various embodiments, native permissions 512 or native permission 516 may be different depending on the characteristics of client 504 or client 506. For example, client 504 and client 506 may be running different operating systems that support or recognize one or more different native permission values.

In one or more of the various embodiments, if client 504 accesses or attempts to access file system object 510, a permissions engine running on server 502 may be arranged to map platform permissions 508 to provide native permissions 512 for client 504. In one or more of the various embodiments, permissions engines may be provided various credential information from the users or services on client 504 that may be attempting to access file system object 510. In one or more of the various embodiments, permissions engines may use the credential information to determine access rights for the users or services attempting access to file system objects. Upon determining the access rights, the permissions engine may enforce access rights for clients making the request for access.

In one or more of the various embodiments, some client types may support access rights that are not supported by other client types. Accordingly, the permissions engine will enforce such access rights for clients that recognize them. Likewise, in some embodiments, even though some access rights/rules in the platform permissions associated with a file system object may be meaningless to some clients, the permissions engine may be arranged to preserve those rights using platform permission values.

In one or more of the various embodiments, permissions engines may be arranged to map platform permission values to various native permission values. Access rights or permissions that may be unknown or not meaningful to a client type will not be represented or carried forward in the their native permissions. However, platform permissions will still maintain those associations and map them to native permission values for clients that support them.

In one or more of the various embodiments, if a user (or service) via a client tries to access a file system object it may provide information (field values, flags, or the like) to the permissions engine that indicates the access rights requested by the user or the access rights that may be available to the user. In some embodiments, the permissions engine may be provided information that enables it to look up users access rights from other services, such as, a LDAP servers, access rights directories/databases, or the like. Likewise, in some embodiments, a permissions engine may be arranged employ one or more external services to confirm or validate credential information before providing access rights. In one or more of the various embodiments, the conditions for requiring such additional credential verification/validation may be vary depending the clients, file system objects, the requested access, or the like. The particular rules or conditions may be provided to a permissions engine via configuration information, policy rules, user-input, or, the like, or combination thereof.

In one or more of the various embodiments, the permissions engine may be arranged to map the requested native access rights which may be described in terms of a client native permission values to platform permission values. In one or more of the various embodiments, the mapping may be arranged to avoid modifying the scope, semantics, or breadth of the requested native access rights.

In one or more of the various embodiments, the permissions engine may compare the platform permissions to the access rights requested by the user. In some embodiments, the permissions engine may be arranged to scan the platform permission values to determine if any of the platform permission values associated with file system object match the rights requested by the user. Note, in some embodiments, this comparison may include testing one or more conditions or rules that may be associated with a permission level. For example, some native permissions systems may be richer or more complex than others. Accordingly, in some embodiments, platform permissions may include support for both richer permission systems, such as, access control lists, as well as, less flexible or less granular permissions systems such as Unix/POSIX-type permissions.

In one or more of the various embodiments, if the permissions engine determines that a file system object is associated with platform permission values that allow the access rights the user is requesting, it will allow the requested access to the requested file system object. Note, as used herein access means or includes requests to read, create, move, update, delete, copy, change permissions, link, unlink, or the like, or combination thereof.

In one or more of the various embodiments, some file system objects, such as, those representing directories or folders may be associated with the same permission values used for files as well as some permission values designed specifically for file system objects that contain other objects, such as, folder or directories. In some embodiments, these permission values may include permission inheritance rules. For example, in one or more of the various embodiments, a directory file system object may be associated with a permission value that indicates that all file system objects stored in the container should be assigned particular permission values. Likewise, in some embodiments, some native permission values may enable container file system objects to be associated with inheritable permission values that require sub-folders or sub-directories or a given folder or directory to be assigned the same permission values as its parent object. Further, in one or more of the various embodiments, some native permission values may enable or require one or more native permission values to be assigned automatically to child objects where the assigned permission values are not necessarily the same as the permission values for its parents.

In one or more of the various embodiments, permissions engines may be arranged to preserve permissions information (using platform permissions) to prevent clients that may use different native permission schemes from overwriting permission values that may be meaningful to other clients using other native permission schemes.

For example, one native permission scheme may support associating file system object access rights to lists of individual users while another native permission system may just support setting permissions for a group, where membership in the group as maintained or understood by the client that enabled those access rights. Accordingly, for example, an admin with super user access rights at a first client, say client 504, may assign a list of users read access rights for a file system object, such as, file system object 510, that are stored in platform permissions 508. Another, admin user on a second client, such as, client 506 may assign read rights for the same file system object to a user group rather than to specifically named users. In this example, the permissions engine will maintain both types of access rights for the same file system object.

Accordingly, in this example, if a user of the first client requests to access file system object 510, the permissions engine may be arranged to confirm that the user has explicit access rights to the file system object before granting access. In this example, the permissions engine compares the requested access rights with the platform permission values associated with file system object 510 to find a first match, if any, that may match the request. Likewise, if a user of the second client requests access the same file system object, a permissions engine may determine if the user is in the group that has been assigned access rights via the second client. However, the since second client (client 506) may provide the permissions engine a username as well as the users group name, the permissions engine may determine that the user has rights based on the permissions set by the first client (client 504) if the username provided by the second client matches a username assigned rights by the first client rather than testing the group membership of the user.

Figures 6A, 6B:
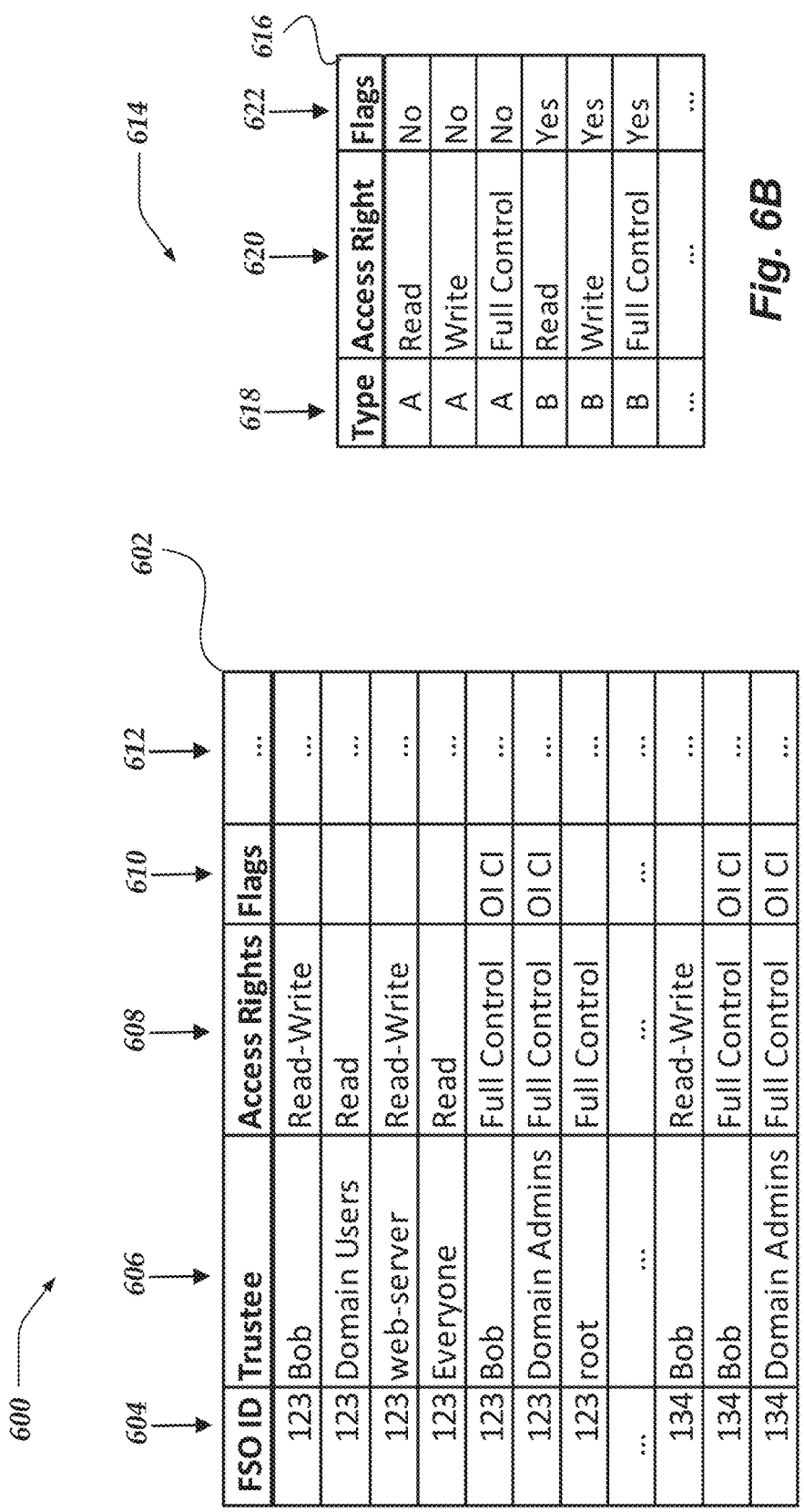
FIG. 6A illustrates a logical representation of a data structure for representing platform permissions in accordance with one or more of the various embodiments.
FIG. 6B illustrates a logical representation of a data structure for representing platform permissions supported by various client types in accordance with one or more of the various embodiments.

FIG. 6A illustrates a logical representation of data structure 600 for representing platform permission values in accordance with one or more of the various embodiments. In one or more of the various embodiments, permissions engines may be arranged to track permissions associated with file system objects using platform permission values. In one or more of the various embodiments, one or more platform permission values may be associated with each file system object. In one or more of the various embodiments, platform permissions may be organized using various data structures. Data structure 600 is one example of a data structure that may be used for associating platform permission values with file system objects.

In one or more of the various embodiments, data structure 600 may include data object 602 that includes several properties. In this example, for clarity and brevity data object 602 is represented using tabular format. However, one of ordinary skill in the art will appreciate that various data structures having the same, more, or less properties arranged in different formats or order may be used without departing from the scope of the innovations described herein.

In one or more of the various embodiments, a data object for managing platform permissions, such as, data object 602, may include properties, such as, file system object identifier 604, trustee 606, access rights 608, flags 610, additional properties 612, or the like.

In one or more of the various embodiments, file system object identifier 604 may represent an identifier that may be used to reference the data or other meta data associated with file system object. In one or more of the various embodiments, trustee 606 represents the user, group, or the like, associated with the access rights. In one or more of the various embodiments, access rights 608 represent platform permission values associated with a trustee and an file system object. In one or more of the various embodiments, flags 610 represent permissions meta-data, and additional properties 612 simply illustrates that data object 602 may include various additional properties that store other information about the platform permission value item or the file system object. For example, in one or more of the various embodiments, additional properties 612 may include additional conditions or rules associated with a platform permission value items, such as, defining which days a platform permissions may be enforced or it may define limitations regarding access to a file system object based on the location or source of the request, such as, on-premises access only versus access from clients outside the internal network.

In one or more of the various embodiments, flags 610 may include values that represent permission inheritance rules for inheritable permission values. For example, some native permission schemes may support permission values that are inheritable by other related file system objects, such as, files stored in a particular folder, or sub-folders of particular folders. Accordingly, for example, if a folder is associated with one or more permission values that may be inheritable, files stored in that folder should automatically inherit those permission values.

In one or more of the various embodiments, permissions engines may be arranged to scan data objects, such as data object 602 to identify if a user or client has the requested or required access rights for a given file system object. The permissions engine may scan data object 602 until it encounters platform permission values that satisfy the access rights requested by the client. In this example, permissions engines may be arranged to scan the items in data object 602 for a given file system object. For example, if a client is requesting read access to file system object 123 (See, FSO ID 604) for a user named Bob, the first item will satisfy the request, enabling the permissions engine to authorize read-access to file system object 123 for Bob.

In one or more of the various embodiments, if the permissions engine does not satisfy the access request with user-level permissions, it may look for less specific permissions attributes, such as, group permissions.

In this example, if Chris is requesting access to file system object 123, the permissions engine will not find user-level access permissions for Chris in data object 602. Accordingly, in one or more of the various embodiments, the permissions engine may check for group level permissions that provide a user access rights based on their group membership or role. In this example, data object 602 indicates that if Chris is a member of Domain Users group, Chris would qualify for read access for file system object 123.

Further, in this example, file system object 134 represents a file system object that was created with inheritable permissions. For example, as described in more detail below with FIG. 10, file system object 134 may be considered to be created by a client that does not support inheritable permissions. For example, in this case, user Bob has created a file (file system object 134) that inherits some permissions from file system object 123. In this example, Bob may have created file system object 134 on a client that supports Unix style native permissions that do not recognize or support inheritable permissions. Accordingly, in this example, the new file, file system object 134, will be assigned read-write permissions for the user that created it, as well as the inheritable permissions associated with file system object 123.

FIG. 6B illustrates a logical representation of data structure 614 for representing platform permissions supported by various client types in accordance with one or more of the various embodiments. Data structure 614 includes data object 616. In this example, data object 616 represents a data object that may be used by a permissions engine to help determine which platform permissions are associated or supported with various client types. In this example, type 618 represent the client type, access right 620 represent the particular platform permission attribute supported by a client type, flags 622 indicates if the client support additional flags, such as flags that indicate if a permission is inheritable.

In this example, for clarity and brevity data object 616 is represented using tabular format. However, one of ordinary skill in the art will appreciate that various data structures having the same, more, or less properties arranged in different formats or order may be used without departing from the scope of the innovations described herein.

Generalized Operations

FIGS. 7-10 represent generalized operations for merged permissions modes in accordance with one or more of the various embodiments. In one or more of the various embodiments, processes 700, 800, 900, and 1000 described in conjunction with FIGS. 7-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may be used for merged permission modes in accordance with at least one of the various embodiments or architectures such as those described in conjunction with FIGS. 4-6. Further, in one or more of the various embodiments, some or all of the actions performed by processes 700, 800, 900, and 1000 may be executed in part by file system engine 322, or permissions engine 324 running on one or more processors of one or more network computers.

Figure 7:
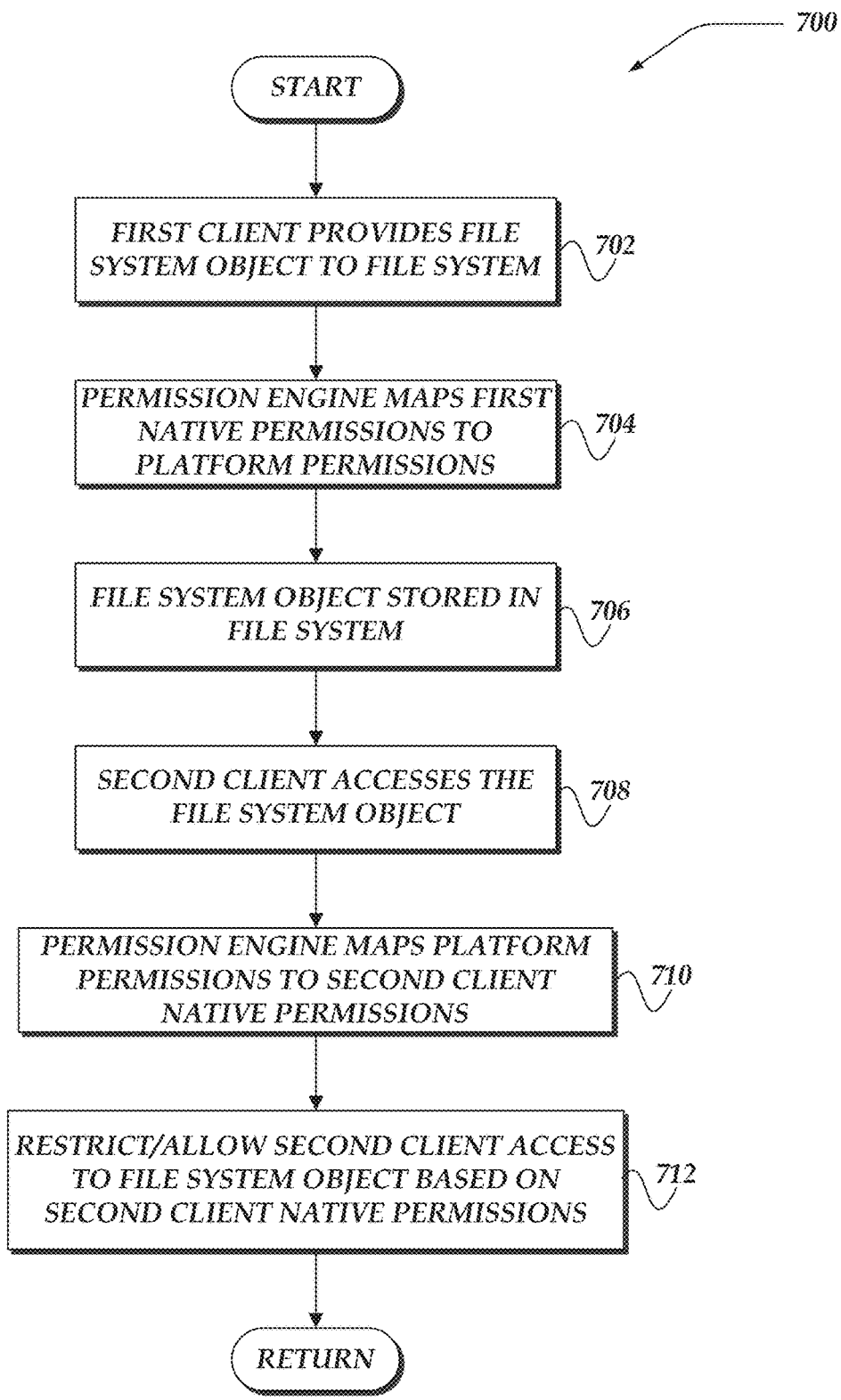
FIG. 7 illustrates an overview flowchart of a process for merged permissions mode in accordance with one or more of the various embodiments.

FIG. 7 illustrates an overview flowchart of process 700 for merged permissions mode in accordance with one or more of the various embodiments. After a start block, at block 702, in one or more of the various embodiments, a first client may provide a file system object to a file system. In one or more of the various embodiments, as discussed above, if clients save or create file system objects, the clients may use permissions that are native to the applications or operating system running on the client. Accordingly, in one or more of the various embodiments, a client may associate native permissions with file system objects.

In one or more of the various embodiments, the operations originating from one or more clients may be supplemented with meta-data that may be obtained at the client before the access request may be communicated to the file system engine or permissions engine. For example, information associated with the file system operation (e.g., user group membership information) may be collected from the client before the access request is provided as meta-data to the file system engine or permissions engine that may handle the access request.

Also, in one or more of the various embodiments, the file system engine or permissions engine may be arranged to lookup or otherwise obtain additional meta-data associated with the requested file system access. For example, in one or more of the various embodiments, a permissions engine may lookup user information from one or more databases or services to confirm group membership or other information that may be relevant to the file system access request.

At block 704, in one or more of the various embodiments, a permissions engine may be arranged to map the native permission values associated with the new file system object to the appropriate platform permission values. In one or more of the various embodiments, a file system that may be accessed by clients using different native permission schemes may be arranged to accept the native permission values provided by clients. In one or more of the various embodiments, there may be one or more different client types (e.g., Windows, Unix, or the like) that have different native permission schemes. In some cases, one or more of these different native permission schemes may support permission values that have different or incompatible semantics.

Accordingly, in one or more of the various embodiments, the permissions engine may apply one or more rules that define how to map native permission values to platform permission values that make up a platform permission scheme. In one or more of the various embodiments, platform permission schemes may be arranged to accommodate the actions or semantics supported by various native permission schemes. Some platform permission values may represent permission semantics that are incompatible or unsupported by some client native permission schemes.

At block 706, in one or more of the various embodiments, the file system engine may then store the file system object in the file system. In one or more of the various embodiments, as discussed above, the platform permission values associated with a file system object may be stored or associated with the file system object. In one or more of the various embodiments, the permission values associated with a file system object may be stored with other meta-data associated with file system object. Also, in some embodiments, a reference to platform permission values for a file system object may be stored with that file system object.

In one or more of the various embodiments, supporting some native permission schemes may require the permissions engine or file system engine to perform additional actions. For example, some native permission schemes support inheritance semantics that propagate permission values to children file system objects (e.g., sub-directories, files stored in directories, files that are copied, or the like). Whereas, other native permission schemes may assign a default set of permission values based on a user irrespective of where a file system object may be located in the file system.

Accordingly, in one or more of the various embodiments, the permissions engine may be arranged to assign platform permission values to file system objects that maintain the expectations of diverse clients that have difference native permission schemes. For example, if a first client sets inheritable permissions on a folder, and second client that does not support inheritable permissions stores a file in that folder, the permissions engine may be arranged to ensure that the file system objects provided by the second client are associated with the inheritable permission values expected by the first client.

At block 708, in one or more of the various embodiments, a second client may attempt to access the file system object. In one or more of the various embodiments, some file systems, especially distributed file systems may be expected to be accessed by clients having different native permission scheme. Accordingly, in one or more of the various embodiments, file system objects created or modified by clients using one kind of native permission scheme may be accessed by other clients that use a different native permission scheme. For example, a file system object created or modified by a Windows client may employ access control lists for native permissions while Unix clients may use conventional Unix mode bits/flags. In this example, it is typical for ACL based permissions to support richer or more granular permission rules that Unix mode bits.

Accordingly, in one or more of the various embodiments, if a client attempts to access a file system object it may request access rights using its native permissions scheme. For example, if opening a file, a Unix client may simply request read-access using Unix mode flags. Accordingly, the Unix client will expect the file system to interpret its native permissions correctly. Likewise, if a Windows client assigns inheritable permission values to a folder, it will expect file system objects contained in that folder to inherit permissions as configured.

At block 710, in one or more of the various embodiments, the permissions engine may be arranged to map the platform permission values to the native permission values compatible with the native permission scheme supported by the second client. In one or more of the various embodiments, similar to block 704, the permissions engine may be arranged to execute one or more rules to convert platform permission values to native permission values that are appropriate for the second client. In one or more of the various embodiments, some or all native permission values may be capable of map to platform permission values.

At block 712, in one or more of the various embodiments, the permissions engine or the file system engine may be arranged to enforce the second client's access based on the native permission values that were determined from the platform permission values. In one or more of the various embodiments, the platform permissions for a file system object are not required to match the access rights requested by a user. For example, the platform permissions for the file system object may comprise a list users that are allowed access and the user associated with the second client access request is not in the list of allowed users, the second client access request may be denied.

Next, control may be returned to a calling process.

Figure 8:
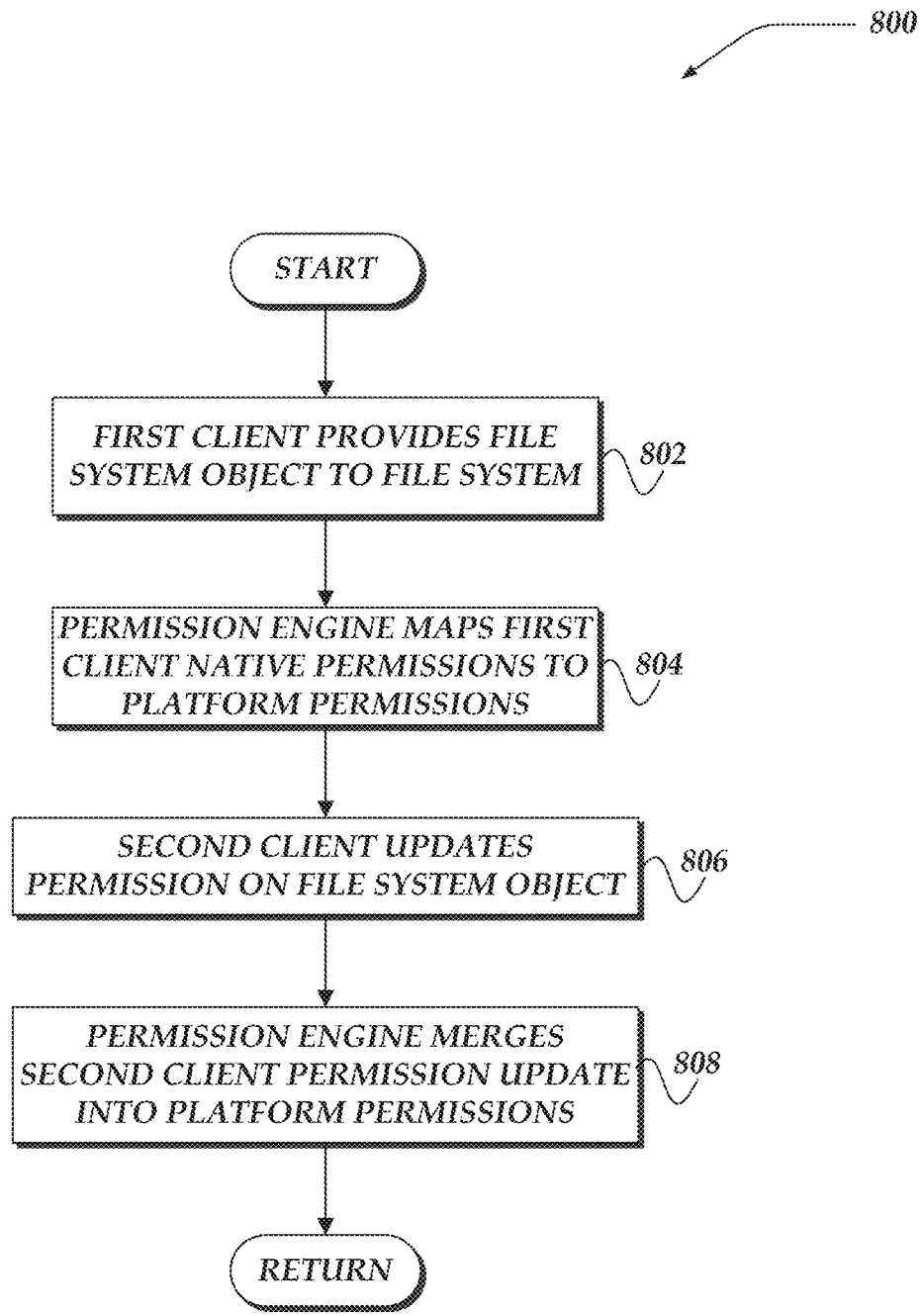
FIG. 8 illustrates a flowchart of a process for merging permissions modes in accordance with one or more of the various embodiments.

FIG. 8 illustrates a flowchart of process 800 for merging permissions modes in accordance with one or more of the various embodiments. After a start block, at block 802, in one or more of the various embodiments, a first client may provide a file system object to the file system. See, block 702 above.

At block 804, in one or more of the various embodiments, the permissions engine may be arranged to map the client native permission values to platform permission values. In one or more of the various embodiments, the permissions engine may determine the native permission values associated with the file system object. These permission values may then be mapped to one or more platform permission values. In one or more of the various embodiments, the permissions engine may be arranged to select platform permission values that mimic or duplicate the native permission values the client has associated with the file system object. In some embodiments, a permissions engine may be arranged to preserve the permission semantics expected by a client. Accordingly, the mapping of native permission values to platform permission values must be sufficient to capture a complete permission picture a client may be trying to establish.

In one or more of the various embodiments, the permissions engine may be arranged to generate an error or other notification if the native permission values provided by a client cannot be sufficiently mapped to platform permission values. In this context, sufficiently mapped platform permissions enable the client to see the same level of native permissions when they attempt to access a file system object that was stored using the same native permissions.

At block 806, in one or more of the various embodiments, a second client may update the permissions of a file system object based on native permissions. In one or more of the various embodiments, a common use case will be when one client using one native permission scheme stores a file system object and another client using a different native permission scheme modifies the file system object or modifies the permission values associated with the file system object. As described above, the second client may provide native permission values with its request to access or modify a file system object. The permissions engine may be arranged to map those native permission values to platform permission values.

At block 808, in one or more of the various embodiments, the permissions engine may be arranged to merge the native permission values associated with the second client's update into the platform permissions associated with the file system object.

In one or more of the various embodiments, the permissions engine may analyze the platform permission values derived from the second client's native permission values to determine how to perform the merging. In some embodiments, the necessary platform permission values may already be associated with a file system object, so no additional merging of permissions may be required.

In one or more of the various embodiments, the permissions engine may discover that the platform permissions associated with the file system object do not include platform permission values that mirror the native permission values requested by the second client. Accordingly, the platform permission values that do so may be added to the platform permissions for the file system object.

In one or more of the various embodiments, the native permissions requested by a client may be mapped to one or more platform permission values. In some embodiments, there may be a sub-set of platform permission values that are common to two or more client native permission schemes. These common value may be shared because they have the same semantics. However, in one or more of the various embodiments, if native permission scheme support permission values that have semantics that are not provided nor understood by all clients, a specific platform permission value may be provided for mapping to those native permissions values.

Accordingly, in one or more of the various embodiments, if the second client is adding a permissions attributes that is not support by one or more other clients, it may be added to the platform permissions collection while leaving other permission values intact.

In one or more of the various embodiments, if different clients using different native permissions were allowed to naively write their own view of permissions (e.g., native permissions) onto a file system object each time they modified the file system object, inconsistencies may be introduced in the permissions system. For example, in some embodiments, a client using Unix-style native permissions has a limited permission vocabulary compared to some other access control list based permissions schemes. Accordingly, for example, if Unix-style permissions overwrite Windows ACL style permissions, there would be the potential to lose permission information that the Windows clients (or Windows administrators) may be relying on. Forcing clients to conform to non-native permissions may be one solution, but in many cases this would be undesirable because client apps (and users) are likely to expect permissions to conform to their native permissions. In some cases, selecting or conforming native permissions to an external non-native permissions may require custom or non-standard operations that may be unavailable for many preexisting applications or services.

Next, control may be returned to a calling process.

Figure 9:
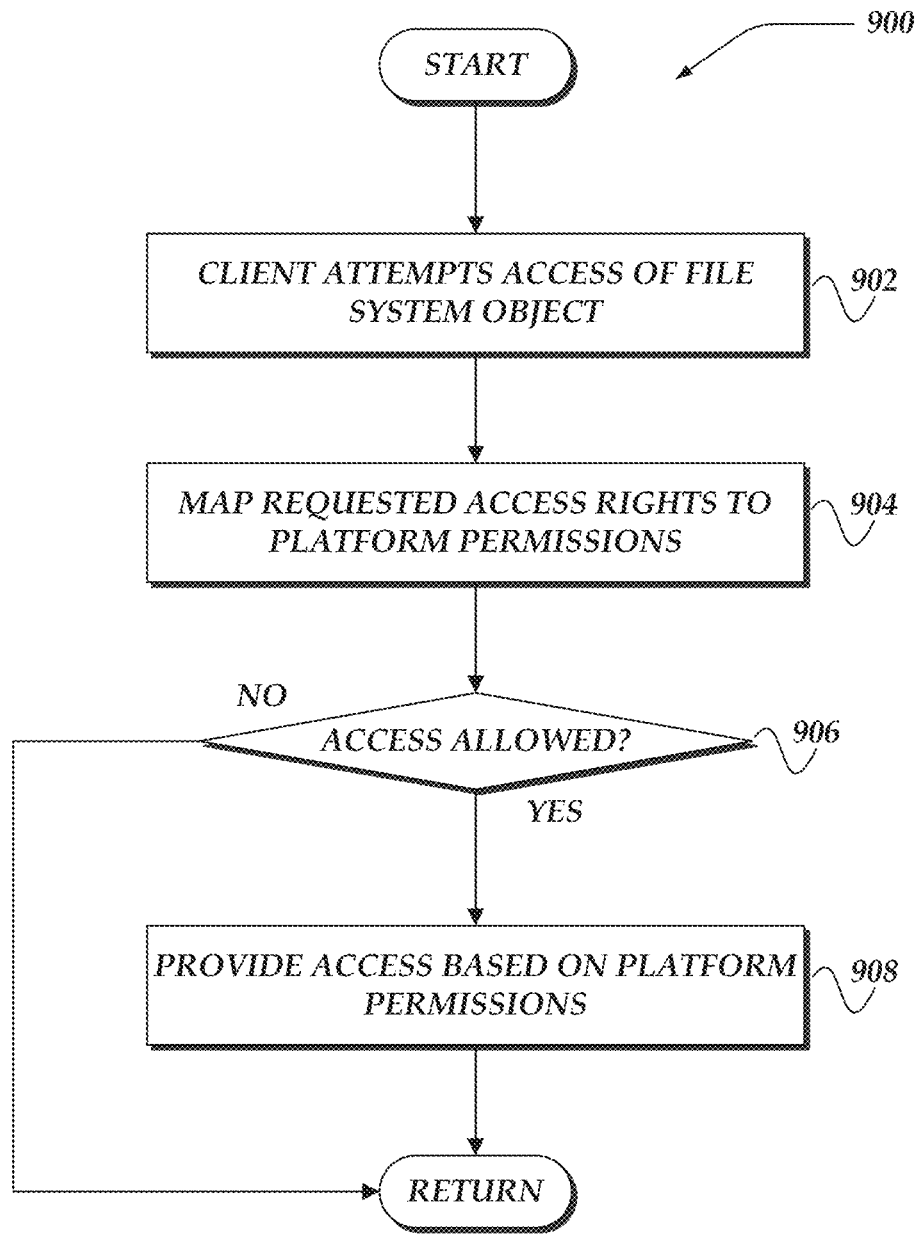
FIG. 9 illustrates a flowchart of a process for merging permissions modes in accordance with one or more of the various embodiments.

FIG. 9 illustrates a flowchart of process 900 for merging permissions modes in accordance with one or more of the various embodiments. After a start block, at block 902, in one or more of the various embodiments, a client may provide a request to a file system to access a file system object. In one or more of the various embodiments, the client may provide native permissions attributes or information that may indicate the access rights requested by the client. As mentioned above, these may include access rights, such as, read access, write access, execution access, or the like.

At block 904, in one or more of the various embodiments, a permissions engine may be arranged to map the requested access rights from native permissions associated with the client to platform permissions. As described above, the permissions engine may execute one or more rules that define how native permissions may be mapped to platform permissions. These rules may be built-in, loaded from configuration information, provided by user input, or the like, or combination thereof.

At decision block 906, in one or more of the various embodiments, if the access rights requested by the client are allowed, control may flow to block 908; otherwise, access may be denied and control may be returned to a calling process. In one or more of the various embodiments, the permissions engine or file system engine may be arranged report some or all of the reasons the client's request to access the file system object was denied. In some embodiments, the permissions engine may be arranged map the reasons for the denial of access to reasons that make sense in the terms of the client's native permissions. Otherwise, the error messages or denial reasons may be unexpected or interpreted incorrectly by the client.

In one or more of the various embodiments, the permissions engine may be arranged to iterate through the platform permissions to determine if the client has the requested access rights. As soon as the permissions engine encounters a platform permission value that provides the requested access rights, the requested access rights may be granted. For example, if a user requesting access is in a group that is assigned the requested access rights, the permissions engine may stop its search for access rights and enable the client to access the file system object.

In one or more of the various embodiments, secondary data structures or databases may be used for determining if a user or client can access a file system object. For example, if the platform permission values require that the requesting user be in a specific user group, the permissions engine may be arranged to obtain or confirm that information from another source.

In some embodiments, the request for access may include enough information, such as, group membership of the requesting user or service. Thus, in some embodiments, the platform engine is not tasked with discerning or managing group subtleties that may vary between the client types. For example, assuming the request itself is trusted, the group names that a user is a member of may be passed in the request for access and treated as tokens. Thus, for example, the permissions engine may look for token matches, rather than performing additional lookups to determine group membership of users.

Accordingly, in one or more of the various embodiments, client-side libraries or services may be arranged to intercept the access requests and provide additional meta-data that may be included in the access request for passing to the permissions engine. For example, in some embodiments, a client may make a conventional file access request that may be automatically routed to libraries or services that are associated with a file system that supports merged permission modes. Accordingly, in this example, before the request is provided to the file system engine or the permissions engine, the additional meta-data, such as, user group membership, may be added to the access request. In particular, in some embodiments, meta-data or credential information that may be unavailable to the file system engine or permissions engine may be provided by the client libraries before forwarding the access request to the file system.

At block 908, in one or more of the various embodiments, the permissions engine may be arranged to provide access the to file system object. In some embodiment, the permissions engine may be arranged to synthesize native permission values from the platform permission values associated with the file system object and return that information to client.

Note, in some embodiments, clients may support more than one native permissions scheme. Accordingly, their requests to access a file system object in a file system may include indicators that directly or indirectly describe which native permission scheme the client expects.

In one or more of the various embodiments, if one or more client native permission schemes do not support semantics of one or more platform permission values associated with a file system object, the permissions engine may be arranged to hide or otherwise not share those permission values with clients that do not support them. Clients that do not understand a permissions semantic do not need to know about it since it is meaningless to them.

Next, control may be returned to a calling process.

Figure 10:
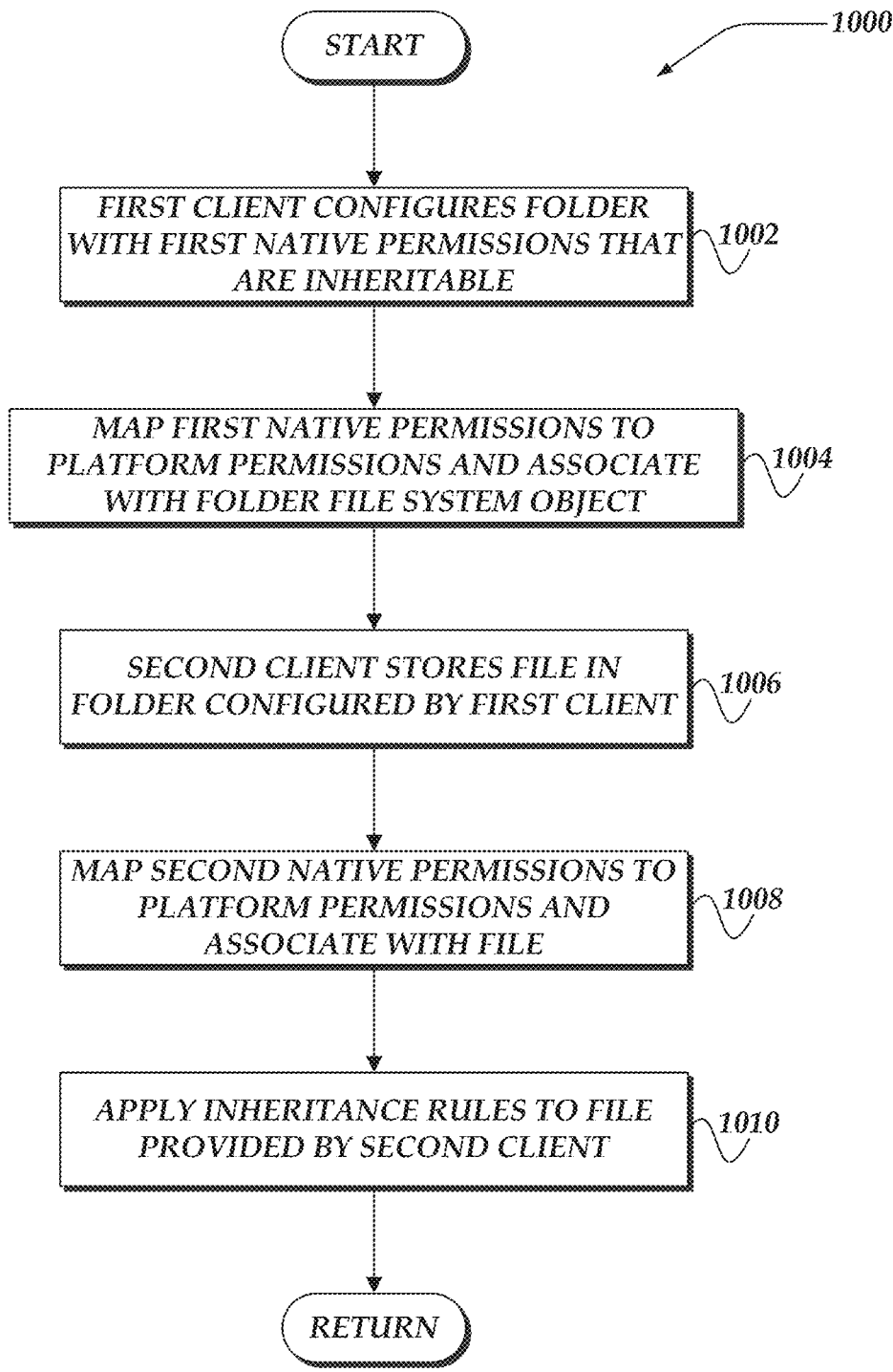
FIG. 10 illustrates a flowchart of a process for managing inheritable permissions in accordance with one or more of the various embodiments.

FIG. 10 illustrates a flowchart of process 1000 for managing inheritable permissions in accordance with one or more of the various embodiments. After a start block, at block 1002, in one or more of the various embodiments, a first client may configure a folder (e.g., directory) file system object to have one or more inheritable permissions. Accordingly, in one or more of the various embodiments, using native permission values of its native permission scheme, the client may send an access request to create folder that has permission values that are intended to be inheritable by file system objects, such as, sub-folders, files, or the like, that may be stored in the folder.

At block 1004, in one or more of the various embodiments, a permissions engine may be instantiated to map the native permission values, including the inheritable native permission values, to platform permission values that are associated with the file system object that represents the folder created by the first client.

At block 1006, in one or more of the various embodiments, a second client may provide a request to the file system engine to store a file system object into the folder created or configured by the first client.

At block 1008, in one or more of the various embodiments, the permissions engine may map the second client native permission values associated with the file being stored to platform permission values. These platform permission values may be associated with the file system object (e.g., the file) that represents the file stored by the second client.

At block 1010, in one or more of the various embodiments, the permissions engine may apply platform permission inheritance rules to the file system object provided by the second client. In this example, the first client may have used a native permission scheme that supports inheritable permission values. Accordingly, in one or more of the various embodiments, the first client (or other clients that have the same native permissions expectations as the first client) will expect applicable file system objects located in the folder it created to have the inheritable permissions values.

However, in this example, for some embodiments, the native permission values used by the second client may not support inheritable permission values. For example, the second client may use a native permissions scheme that sets the permissions of a new file based on the user that is creating it. In this example, such clients may be unaware of inheritable permissions.

Accordingly, in one or more of the various embodiments, the permissions engine will perform actions to determine if inheritable permission values should be associated with the file system object. For example, if the inheritable permission values define ACL permissions for child objects, these inheritable permission values may be automatically associated with the file system object. This may include analyzing the platform permission values associated with a parent file system object to determine if it is associated with inheritable permission values. If so, the child file system objects should be associated with the inheritable permissions values. Note, in this example, for some embodiments, because the second client does not support inheritable permissions, the inherited permission values may not map to native permission values of the second client. Thus, if the second client accesses the file it just created, it will appear to the second client as having the native permission values it initially provided absent the inherited permission values. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by

Letters Patent of the United States is:

1. A method for managing data in a file system over a network using one or more processors that execute instructions to perform actions, comprising:
   instantiating a file system engine to perform actions including:
      providing a file system that includes one or more file system objects, wherein the one or more file system objects are accessible by two or more clients that use different native permission schemes; and
      receiving from a client, an access request that is associated with the one or more file system objects, wherein the access request includes one or more native permission values that are supported by the client; and
   instantiating a permissions engine to perform actions including:
      providing one or more platform permission values from a platform permission scheme, wherein the one or more platform permission values are associated with the one or more file system objects, and wherein the platform permission scheme reduces computing resources employed to access the one or more file system objects by replacing use of the two or more different native permission schemes;
      providing one or more requested platform permission values based on the platform permission scheme and the native permission values included in the access request;
      comparing the one or more requested platform permission values to the platform permission values associated with the one or more file system objects; and
      providing access rights to the one or more file system objects based on an affirmative result of the comparison.

2. The method of claim 1, wherein the comparison, further comprises:
   iterating though the one or more platform permission values; and
   determining the access rights to the one or more file system objects based on a first platform permission value that matches the access request.

3. The method of claim 1, wherein the file system engine performs further actions, including:
   receiving a request from the client to store a file system object in the file system, wherein the file system object is associated with one or more native permission values; and
   employing the permissions engine to associate one or more inheritable platform permission values to the file system object based on the platform permission values that are associated with a parent file system object or a container file system object associated with the file system object.

4. The method of claim 1, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

5. The method claim 1, wherein the permissions engine performs further actions, including:
   providing one or more other requested permission values included in another access request from another client, wherein the other access request is associated the one or more file system objects, and wherein the one or more other requested permission values are unsupported by the native permission scheme used by the client; and
   associating both the one or more requested permission values and the one or more other permission values with the one or more file system objects.

6. The method of claim 1, wherein providing the one or more platform permission values, further comprises:
   providing one or more joint platform permission values that are supported by each of the two or more clients; and
   providing one or more disjoint platform permission values that are supported by less than all of the two or more clients.

7. The method of claim 1, wherein the comparison, further comprises:
   communicating with a separate service to confirm one or more characteristics of the client or the access request; and
   modifying the provided access rights based on a response to the communication.

8. A processor readable non-transitory storage media that includes instructions for managing data in a file system over a network, wherein execution of the instructions by one or more processors on one or more network computers performs actions, comprising:
   instantiating a file system engine to perform actions including:
      providing a file system that includes one or more file system objects, wherein the one or more file system objects are accessible by two or more clients that use different native permission schemes; and
      receiving from a client, an access request that is associated with the one or more file system objects, wherein the access request includes one or more native permission values that are supported by the client; and
   instantiating a permissions engine to perform actions including:
      providing one or more platform permission values from a platform permission scheme, wherein the one or more platform permission values are associated with the one or more file system objects, and wherein the platform permission scheme reduces computing resources employed to access the one or more file system objects by replacing use of the two or more different native permission schemes;
      providing one or more requested platform permission values based on the platform permission scheme and the native permission values included in the access request;
      comparing the one or more requested platform permission values to the platform permission values associated with the one or more file system objects; and
      providing access rights to the one or more file system objects based on an affirmative result of the comparison.

9. The media of claim 8, wherein the comparison, further comprises:
   iterating though the one or more platform permission values; and
   determining the access rights to the one or more file system objects based on a first platform permission value that matches the access request.

10. The media of claim 8, wherein the file system engine performs further actions, including:

receiving a request from the client to store a file system object in the file system, wherein the file system object is associated with one or more native permission values; and employing the permissions engine to associate one or more inheritable platform permission values to the file system object based on the platform permission values that are associated with a parent file system object or a container file system object associated with the file system object.

11. The media of claim 8, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

12. The media of claim 8, wherein the permissions engine performs further actions, including:
   providing one or more other requested permission values included in another access request from another client, wherein the other access request is associated with the one or more file system objects, and wherein the one or more other requested permission values are unsupported by the native permission scheme used by the client; and
   associating both the one or more requested permission values and the one or more other permission values with the one or more file system objects.

13. The media of claim 8, wherein providing the one or more platform permission values, further comprises:
   providing one or more joint platform permission values that are supported by each of the two or more clients; and
   providing one or more disjoint platform permission values that are supported by less than all of the two or more clients.

14. The media of claim 8, wherein the comparison, further comprises:
   communicating with a separate service to confirm one or more characteristics of the client or the access request; and
   modifying the provided access rights based on a response to the communication.

15. A system for managing data in a file system comprising:
   a network computer, comprising:
      a transceiver that communicates over the network;
      a memory that stores at least instructions; and
      one or more processors that execute instructions that perform actions, including:
         instantiating a file system engine to perform actions including:
            providing a file system that includes one or more file system objects, wherein the one or more file system objects are accessible by two or more clients that use different native permission schemes; and
            receiving from a client, an access request that is associated with the one or more file system objects, wherein the access request includes one or more native permission values that are supported by the client; and
         instantiating a permissions engine to perform actions including:
            providing one or more platform permission values from a platform permission scheme, wherein the one or more platform permission values are associated with the one or more file system objects, and wherein the platform permission scheme reduces computing resources employed to access the one or more file system objects by replacing use of the two or more different native permission schemes;
            providing one or more requested platform permission values based on the platform permission scheme and the native permission values included in the access request;
            comparing the one or more requested platform permission values to the platform permission values associated with the one or more file system objects; and
            providing access rights to the one or more file system objects based on an affirmative result of the comparison; and
   a client computer, comprising:
      a transceiver that communicates over the network;
      a memory that stores at least instructions; and
      one or more processors that execute instructions that perform actions, including:
         providing the access request to the file system engine.

16. The system of claim 15, wherein the comparison, further comprises:
   iterating though the one or more platform permission values; and
   determining the access rights to the one or more file system objects based on a first platform permission value that matches the access request.

17. The system of claim 15, wherein the file system engine performs further actions, including:
   receiving a request from the client to store a file system object in the file system, wherein the file system object is associated with one or more native permission values; and
   employing the permissions engine to associate one or more inheritable platform permission values to the file system object based on the platform permission values that are associated with a parent file system object or a container file system object associated with the file system object.

18. The system of claim 15, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

19. The system of claim 15, wherein the permissions engine performs further actions, including:
   providing one or more other requested permission values included in another access request from another client, wherein the other access request is associated the one or more file system objects, and wherein the one or more other requested permission values are unsupported by the native permission scheme used by the client; and
   associating both the one or more requested permission values and the one or more other permission values with the one or more file system objects.

20. The system of claim 15, wherein providing the one or more platform permission values, further comprises:
provided one or more joint platform permission values that are supported by each of the two or more clients; and
providing one or more disjoint platform permission values that are supported by less than all of the two or more clients.

21. The system of claim 15, wherein the comparison, further comprises:
communicating with a separate service to confirm one or more characteristics of the client or the access request; and
modifying the provided access rights based on a response to the communication.

22. A network computer for managing data in a file system, comprising:
a transceiver that communicates over the network;
a memory that stores at least instructions; and
one or more processors that execute instructions that perform actions, including:
instantiating a file system engine to perform actions including:
providing a file system that includes one or more file system objects, wherein the one or more file system objects are accessible by two or more clients that use different native permission schemes; and
receiving from a client, an access request that is associated with the one or more file system objects, wherein the access request includes one or more native permission values that are supported by the client; and
instantiating a permissions engine to perform actions including:
providing one or more platform permission values from a platform permission scheme, wherein the one or more platform permission values are associated with the one or more file system objects, and wherein the platform permission scheme reduces computing resources employed to access the one or more file system objects by replacing use of the two or more different native permission schemes;
providing one or more requested platform permission values based on the platform permission scheme and the native permission values included in the access request;
comparing the one or more requested platform permission values to the platform permission values associated with the one or more file system objects; and
providing access rights to the one or more file system objects based on an affirmative result of the comparison.

23. The network computer of claim 22, wherein the comparison, further comprises:
iterating though the one or more platform permission values; and
determining the access rights to the one or more file system objects based on a first platform permission value that matches the access request.

24. The network computer of claim 22, wherein the file system engine performs further actions, including:
receiving a request from the client to store a file system object in the file system, wherein the file system object is associated with one or more native permission values; and
employing the permissions engine to associate one or more inheritable platform permission values to the file system object based on the platform permission values that are associated with a parent file system object or a container file system object associated with the file system object.

25. The network computer of claim 22, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

26. The network computer of claim 22, wherein the permissions engine performs further actions, including:
providing one or more other requested permission values included in another access request from another client, wherein the other access request is associated the one or more file system objects, and wherein the one or more other requested permission values are unsupported by the native permission scheme used by the client; and
associating both the one or more requested permission values and the one or more other permission values with the one or more file system objects.

27. The network computer of claim 22, wherein providing the one or more platform permission values, further comprises:
providing one or more joint platform permission values that are supported by each of the two or more clients; and
providing one or more disjoint platform permission values that are supported by less than all of the two or more clients.

28. The network computer of claim 22, wherein the comparison, further comprises:
communicating with a separate service to confirm one or more characteristics of the client or the access request; and
modifying the provided access rights based on a response to the communication.

* * * * *